United States Patent [19]
Bichel

[11] 3,962,896
[45] June 15, 1976

[54] METHOD OF PRODUCING V-BELT PULLEYS AND SPINNING LATHE FOR CARRYING OUT SUCH METHOD

[75] Inventor: Joachim H. Bichel, Oeventrop, Germany

[73] Assignee: Leifeld & Co., Ahlen, Germany

[22] Filed: Nov. 19, 1974

[21] Appl. No.: 525,277

[30] Foreign Application Priority Data
Nov. 23, 1973 Germany............................ 2358364

[52] U.S. Cl. .................................................... 72/82
[51] Int. Cl.² ......................................... B21D 22/14
[58] Field of Search .................. 72/82, 105, 344, 84

[56] References Cited
UNITED STATES PATENTS

| | | |
|---|---|---|
| 2,062,415 | 12/1936 | Harrison .................................. 72/82 |
| 2,685,856 | 8/1954 | Wickwire et al. ....................... 72/82 |
| 3,161,222 | 12/1964 | Hendricks ............................... 72/84 |
| 3,654,790 | 4/1972 | Zatko ...................................... 72/82 |
| 3,852,863 | 12/1974 | Killian .................................... 72/82 |

*Primary Examiner*—Milton S. Mehr
*Attorney, Agent, or Firm*—Cushman, Darby & Cushman

[57] ABSTRACT

Spinning method for producing V-belt pulleys comprising the steps of preforming the grooves, decreasing the width of the grooves by compression and finally shaping the grooves. The spinning lathe comprises an eccentrically mounted and axially movable inner roller forming a back up roller for the shaping roller.

4 Claims, 1 Drawing Figure

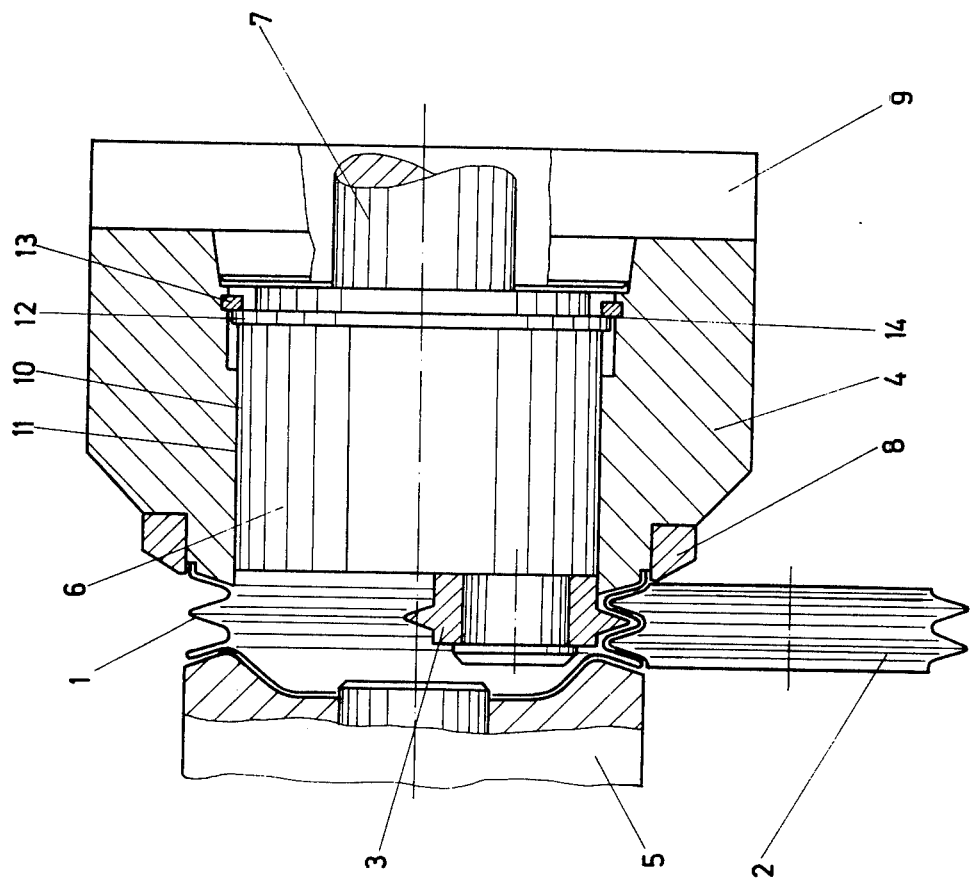

METHOD OF PRODUCING V-BELT PULLEYS AND SPINNING LATHE FOR CARRYING OUT SUCH METHOD

The present invention relates to a method of producing cylindrical hollow bodies having two or more V-shaped peripheral grooves, especially V-belt pulleys, whereby a cup-shaped pre-drawn part is formed from a round by deep drawing, as well as to a spinning lathe (compress-forming machine) comprising a rotatable chuck and a rotary back-up disc being axially movable relative to said chuck, for carrying out such method.

It is already known to produce V-belt pulleys or similar cylindrical hollow bodies having two or more V-shaped circumferential grooves on spinning lathes, whereby for supporting the workpiece within the upstanding portions, there are used inside chucks comprising chuck segments. These chuck segments may be extended and retracted as required such that they provide the necessary support for the upstanding portions during the forming operation. For example, U.S. Pat. No. 2,892,431 discloses an arrangement of wedge type segments wherein no gap is formed between the individual segments even when spreading them such that such gaps do not form neither visible nor sensible marks interiorly or exteriorly of the V-belt pulley profile.

However, it is a disadvantage in these conventional wedge-type segments that the parts of the apparatus are uneconomical, complicated and, particularly, of relatively great dimensions, such that smaller V-belt pulleys having an outer diameter of e.g. 140 millimeters cannot be formed by the known methods.

The complexity or complicated construction of the conventional apparatuses is the cause of a high susceptibility to trouble, and, in particular, the known spinning lathes are expensive, complex and heavy for this reason, while the quality of the V-belt pulleys produced on such machines has been low due to the low stability of the known wedge-type segment devices. Further the spreading of the wedge-type segments requires a longer switching period, while the ejection of the finished article is accompanied by problems.

In comparison with this prior art, it is the object of the present invention to provide a method and a spinning lathe or compress-forming machine for carrying out such method, which allow V-belt pulleys having two or more V-shaped grooves to be produced in a particularly economical manner. The spinning lathe, at the same time, should be of a very simple, stable and trouble-free construction, while the method should lend itself to be performed rapidly and free from trouble due to short switching periods and the easy removal of the final product. Furthermore, the method according to the present invention in combination with the spinning lathe according to the invention should permit the production of V-belt pulleys of maximum quality with a precision of production and uniformity which could not be obtained heretofore.

According to the present invention, the above object is solved in the above-described compress-forming method in that (1) a cup-shaped pre-drawn part is conventionally formed by pinning or deep drawing, (2) a preform part is next formed by grooving the cylindrical surface of the pre-drawn part in a first re-shaping process by spinning or compress-forming on a chuck, (3) the chuck is upset by movement of the chuck portions toward each other by decreasing the width of the grooves, and (4) the final contour of the grooves is formed by spinning or compress-forming in a further re-shaping process. According to this invention, at least the further re-shaping process for forming the final contour is effected by compression of the roller against an inner roller.

In order to simplify the method, advantageously the first re-shaping step may comprise a drawing-in step without any support of the pre-drawn workpiece from the inner side, and in order that the inner roller may follow the change of position of the protruding portions of the V-belt pulley brought about during the final shaping, this roller is subject to a displacement during the re-shaping process.

Advantageously, the spinning lathe for carrying out the method according to the invention is characterized by an eccentrically mounted and axially movable inner roller forming a back-up roller for the outer shaping roller.

In a further embodiment of the spinning lathe according to the invention, the inner roller may be rotatably mounted in an eccentric position on a roller mounting body, and the peripheral surface of the roller mounting body may form a slide bearing with the inner surface of the chuck, whereby rotation of the chuck for the compress-forming process is rendered possible without driving the roller bearing body by simultaneously mounting it for rotation.

In order to limit the movement of the roller bearing body, the apparatus according to the invention may be characterized by a collar on the roller bearing body, whereby a ring is inserted into the internal groove of the chuck, and such collar cooperates operatively with the ring for positional limitation.

In order to avoid expansion of the edges of the V-belt pulley, a back-up ring may be provided at the workpiece end of the chuck, and in order to impart a positive motion to the inner roller, the main spindle may be provided with an inner bore through which the thrust axle of the roller bearing body extends, whereas the positioning of the roller bearing body and of the inner roller being rotatably mounted thereon in an eccentric position can be effected through a device for moving the thrust axle. Further, by rotating the thrust axle, the inner roller may be brought to a different peripheral position such that it may perform, for instance, also a supporting function during the rolling displacement.

In the following, an exemplary embodiment of the invention is described in greater detail by referring to the enclosed drawing. The drawing shows a schematic, sectional view of the V-belt pulley to be re-shaped during the final re-shaping step, in combination with the portion of a spinning lathe being specifically designed for such re-shaping process.

The method according to the invention is suitable particularly for the production of V-belt pulleys down to a minimum size equal to an outer diameter of 90 millimeters, without any limitation with respect to the maximum dimensions. The method and the apparatus according to the invention are suitable both for producing V-belt pulleys having two grooves and for pulleys having a greater number of grooves.

As shown in the FIGURE, the pre-drawn workpiece or preform which may be conventionally formed as a cup e.g. by means of a deep drawing process, is clamped between a backup disc 5 and a clamping chuck 4, whereby an outer ring 8 acting as a back-up ring provides for a precise positioning and driving of the pre-drawn part during the first re-shaping step in which the spaces are formed.

The workpiece is rotated together with the chuck 4 and the back-up disc 5 by the drive means of the spinning lathe and the spindle support 9. Hereupon, a rounded preform is produced in a known manner by adjusting the preforming rollers (not shown).

The preform can be produced in the first reshaping step either by spinning the pre-drawn part without back-up whereby the pre-drawn part provides for the shaping during spinning due to its inherent stiffness, or, in a further embodiment of the invention, this first re-shaping step can be brought about by spinning compression against an inner roller 3.

Hereby, the inner roller 3, by rotating the thrust axle 7, would be positioned to that part of the circumference where the preforming roller engages.

After grooving the predrawn part to form the preform, an upsetting step is performed by the back-up or pressure disc 5 in a likewise known manner, whereby the final forming roller 2, as shown in the drawing, may already be moved into the grooves thereby ensuring that the upsetting step provides the predetermined shape in the desired manner.

The spinning chuck 4 is bored with an internal recess, and a roller bearing body 6 is inserted into the center bore, which body carries an eccentrically positioned inner roller 3 at its end adjacent the workpiece. The inner roller 3 is rotatable about its center axis; however, the inner roller during the preforming step in which the part is grooved can be moved in an axial direction only if the preforming step should be performed without back-up. The outer configuration of this inner roller corresponds to the inner groove of the V-belt pulley.

The roller bearing body 6 is connected to a thrust axle 7 which is axially movable by means of a not illustrated device, e.g. a hydraulic cylinder, and which transmits the axial displacement to the roller bearing body 6. The roller bearing body 6 includes an outer surface 10 which forms a slide bearing with the inner surface of the chuck 4 thereby allowing rotation of the chuck 4 about the roller bearing body 6 and rendering possible an axial displacement of the latter.

In a further embodiment of the invention, an antifriction bearing or a series of antifriction bearings adapted to be displaced may be provided between the chuck 4 and the roller bearing body 6. In order to limit the axial displacement of the roller bearing body 6, the latter carries a collar 12 at its end remote from the workpiece, which collar cooperates with a ring 13 inserted into an inner groove 14. Hereby, the ring 13 acts as a stop for the collar 12.

The back-up disc 5 is likewise movable in axial direction, and the upsetting of the pre-drawn part can then be effected with an adjustable upsetting force or at an adjustable upsetting rate, respectively, as proposed e.g. in applicant's German patent application No. P22 230 03. Explicit reference is made to the disclosure of this application, such that a more detailed explanation can be omitted at this point.

As described above, the roller bearing body 6 per se does not rotate, whereas the ecentrically mounted inner roller 3 rotates under the action of the inner surface of the V-belt pulley to be formed.

During the final re-shaping process, the inner roller 3 along with the roller bearing body 6 performs an axial movement in order to conform its position to the shortening profile of the groove. Movement of the inner roller 3 can be performed under control or even by the shortening of the profile of the V-belt pulley itself; as mentioned above, such movement is limited by the collar 12 in cooperation with the ring 13.

If the displacement is effected under control, the power transmission is provided through the thrust rod or axle 7 which is mounted for axial movement e.g. by the hollow main spindle and the spindle support 9. As the driving means for the thrust rod 7, there may be used either a hydraulic cylinder or a mechanical drive or even other conventional driving means.

The axial movability of the inner roller 3 is of particular importance when the finished V-belt pulley is removed from the spinning lathe according to the invention, because the V-belt pulley is required first to be displaced by a certain distance from the chuck 4, before it can be eccentrically disengaged from the inner roller 3.

Upon disengagement of the V-belt pulley, the latter may then be withdrawn automatically or manually. Prior to the ejection of the V-belt pulley, whereby the inner roller 3 in combination with the roller bearing body 6 may act as an ejector, the back-up disc 5, in a manner being self-evident to the expert, has already been retracted so as to provide sufficient clearance.

Preferably, the inner roller 3 is used during the final shaping step of the V-belt pulley; however, as described above, the inner roller 3 may be in engagement with the pulley already during the upsetting step or even during the pre-shaping process.

In a manner being surprising to the expert, the method according to the invention represents a simple and particularly economical solution for the production of V-belt pulleys of a high quality which could not be attained heretofore.

We claim:

1. A spinning lathe for producing a cylindrical body having at least two V-shaped peripheral grooves comprising a rotary clamping chuck and a rotary backup disc axially movable relative to said clamping chuck for receiving therebetween said body, a shaping roller for grooving the exterior of said body, an eccentrically mounted and axially movable inner roller forming a back-up roller for the shaping roller, and means for mounting said inner roller for movement along the rotary axis of said clamping chuck.

2. The apparatus according to claim 1, wherein said inner roller is rotatably mounted in an eccentric position on a roller bearing body the circumferential surface of which forms a slide bearing in combination with the inner surface of said chuck.

3. The apparatus according to claim 1 further including a stationary or movable back-up ring on the end of said chuck adjacent the workpiece.

4. The apparatus according to claim 1 wherein said mounting means includes a main spindle having an internal bore through which a thrust axle of said roller bearing body passes, and means for axially moving said roller bearing body, said inner roller being rotatably mounted to said bearing body whereby said thrust axle at the time serves to position said inner roller on the periphery of said workpiece to which end said thrust axle is rotatable relative to said main spindle.

* * * * *